United States Patent

Mine et al.

[11] Patent Number: 5,785,727
[45] Date of Patent: Jul. 28, 1998

[54] GLASS FORMING MACHINE

[75] Inventors: Shinya Mine; Yutaka Segawa; Masao Tamura, all of Tokyo, Japan

[73] Assignee: Asahi Glass Company Ltd., Tokyo, Japan

[21] Appl. No.: 778,822

[22] Filed: Jan. 3, 1997

[30] Foreign Application Priority Data

Apr. 9, 1996 [JP] Japan ................. 8-086917

[51] Int. Cl.$^6$ ........................ C03B 40/027
[52] U.S. Cl. ........................ 65/169; 65/305; 65/26; 901/49; 239/132.3; 239/397.5; 239/288
[58] Field of Search ................. 65/24, 26, 63, 65/68, 71, 102, 169, 170, 305, 308; 901/49, 43; 239/132.3, 397.5, 288, 288.3; 118/317, 318, 323, 326

[56] References Cited

U.S. PATENT DOCUMENTS

| | | | |
|---|---|---|---|
| 1,217,635 | 2/1917 | Rankin | 65/170 |
| 1,308,820 | 7/1919 | Tillyer et al. | 65/26 |
| 1,675,952 | 7/1928 | Middendorf | 65/170 |
| 2,410,422 | 11/1946 | Breene et al. | 65/169 |
| 3,132,018 | 5/1964 | Prendergast et al. | 65/71 |
| 3,141,752 | 7/1964 | Keller | 65/169 |
| 3,309,190 | 3/1967 | Belentepe et al. | 65/24 |
| 3,582,303 | 6/1971 | Stutske | 65/308 |
| 3,623,856 | 11/1971 | Keller | 65/170 |
| 3,721,542 | 3/1973 | Keller | 65/170 |
| 3,801,299 | 4/1974 | Renkl | 65/169 |
| 3,814,594 | 6/1974 | Mumford | 65/170 |
| 4,409,010 | 10/1983 | Brown | 65/170 |
| 4,578,099 | 3/1986 | Hubner et al. | 65/169 |
| 4,632,689 | 12/1986 | De Willigen et al. | 65/308 |
| 4,704,152 | 11/1987 | Davey | 65/308 |
| 4,765,821 | 8/1988 | Doud | 65/170 |
| 4,853,022 | 8/1989 | Renkl et al. | 65/170 |
| 4,867,777 | 9/1989 | Doud | 65/170 |
| 4,904,514 | 2/1990 | Morrison et al. | 901/49 |
| 4,990,171 | 2/1991 | Kojima et al. | 65/169 |
| 5,120,341 | 6/1992 | Nozawa et al. | 65/169 |
| 5,139,560 | 8/1992 | Renkl et al. | 65/170 |
| 5,212,432 | 5/1993 | Ohtani et al. | 901/49 |
| 5,440,916 | 8/1995 | Stone et al. | 901/49 |

Primary Examiner—Steven P. Griffin
Attorney, Agent, or Firm—Oblon, Spivak, McClelland, Maier & Neustadt, P.C.

[57] ABSTRACT

A spray device which is provided with a nozzle for spraying a lubricant is arranged in proximity to a bottom mold and/or a plunger, and the nozzle is operated and controlled by a control device to spray the lubricant on a mold surface of the bottom mold and/or the plunger.

4 Claims, 5 Drawing Sheets

GLASS FORMING MACHINE

BACKGROUND OF THE INVENTION

1. Field of the Invention

The present invention relates to a glass forming machine, in particular a glass forming machine which presses a molten glass gob (hereinbelow referred to as "the gob") into panel glass or funnel glass for a CRT (Braun tube), and a glass forming method for spraying a lubricant on a mold surface of a bottom mold or a plunger.

2. Discussion of Background

There has been known a glass forming machine wherein the gob is loaded into a bottom mold, a plunger arranged above the bottom mold is lowered by a press machine and the gob in the bottom mold is pressed into such panel glass or funnel glass by the plunger. In such a glass forming machine, a lubricant is applied on an inner wall surface of the bottom mold and an outer wall surface of the plunger to facilitate separation of the plunger from a glass product and removal of the glass product from the bottom mold after pressing. A lubricant applying operation has been carried out by human hands.

However, carrying out the lubricant applying operation in high temperature atmosphere in a the glass forming machine creates problems in that not only a worker is endangered but also the worker is adversely effected.

In a machine which includes a plurality of bottom molds and carries out pressing by a single plunger, the lubricant applying operation has to be carried out for a short period of time (about 3 seconds) wherein pressing is stopped, having a problem in that difficulty in complete application of the lubricant by human hands creates bare spots.

SUMMARY OF THE INVENTION

The present invention has been made conceived considering such circumstances. It is an object of the present invention to provide a glass forming machine capable of automating the lubricant applying operation.

As a most preferred solution to attain the object, the present invention provides a glass forming machine which comprises a plurality of bottom molds which are arranged on a peripheral portion of an index table at predetermined intervals, and into which respect gobs are loaded in a predetermined order; and a plunger which presses the gob in a bottom mold located therebelow by intermittent rotation of the index table wherein a spray device which is provided with a nozzle for spraying a lubricant is arranged, through vibration-proof means and a frame, at a fixed part of the glass forming machine in proximity to at least one of the bottom molds and the plunger, and the spray device is operated and controlled to spray the lubricant on a mold surface of one of the bottom molds and the plunger.

The present invention also provides a glass forming method wherein a gob is supplied into a bottom mold and is pressed by a plunger, comprising: arranging a spray device with a spray nozzle in proximity to at least one of the bottom mold and the plunger; and operating the nozzle while one of the bottom mold and the plunger is held in stand-by, so that a lubricant is automatically sprayed on a mold surface of the at least one of the bottom mold and the plunger.

According to the present invention, the spray device which is provided with the nozzle for spraying the lubricant is arranged in proximity to at least one of the bottom molds and the plunger, and the spray device is operated and controlled to spray the lubricant onto the mold surface of the molds and the plunger. The invention allows the lubricant to be sprayed by the spray device to automate the lubricant spraying operation.

According to the invention, the spray device is arranged, through the vibration-proof means and the frame, at the fixed part of the glass forming machine. The provision of the spray device at the fixed part of the glass forming machine eliminates the need for additional space for the spray device at a peripheral portion of the glass forming machine to establish space saving, and removes the vibration from the glass forming machine by the vibration-proof means to prevent the spray device from breaking down due to the vibration.

According to the invention, the frame may be arranged at the fixed part of the glass forming machine through the moving means. In particular, when the spray device is arranged in proximity to a bottom mold, a breakdown of the spray device during spraying the lubricant has an adverse effect on loading of the gob and pressing by the plunger. When the spray device breaks down, the frame is withdrawn by the moving means to take the spray device away from the bottom molds. Such an arrangement allows loading of the gob and pressing by the plunger to be carried out without stopping the operation of the glass forming machine. When any repairing of the spray device has been completed, the frame is advanced by the moving means to bring the spray device close to a bottom mold, returning the spray device to the active position. The spray device may be covered by a heat resistant jacket to be protected from a high temperature atmosphere of the glass forming machine, improving the durability of the spray device. When cooling air is supplied from cooling air supplying means into the heat resistant jacket to forcibly cool the spray device, the durability of the spray device can be further improved.

According to the invention, evacuating means may be provided in proximity to the spray device to suck and evacuate smoke which is generated when the lubricant is sprayed. Such an arrangement can maintain the atmosphere of the glass forming machine in a clean state.

By the way, when each of the bottom molds has an upper portion engaged with a ring mold, the ring mold can be treated as a part of each of the bottom molds.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, preferred embodiments of the glass forming machine according to the present invention will be described in detail with reference to the accompanying drawings.

Figure 1:
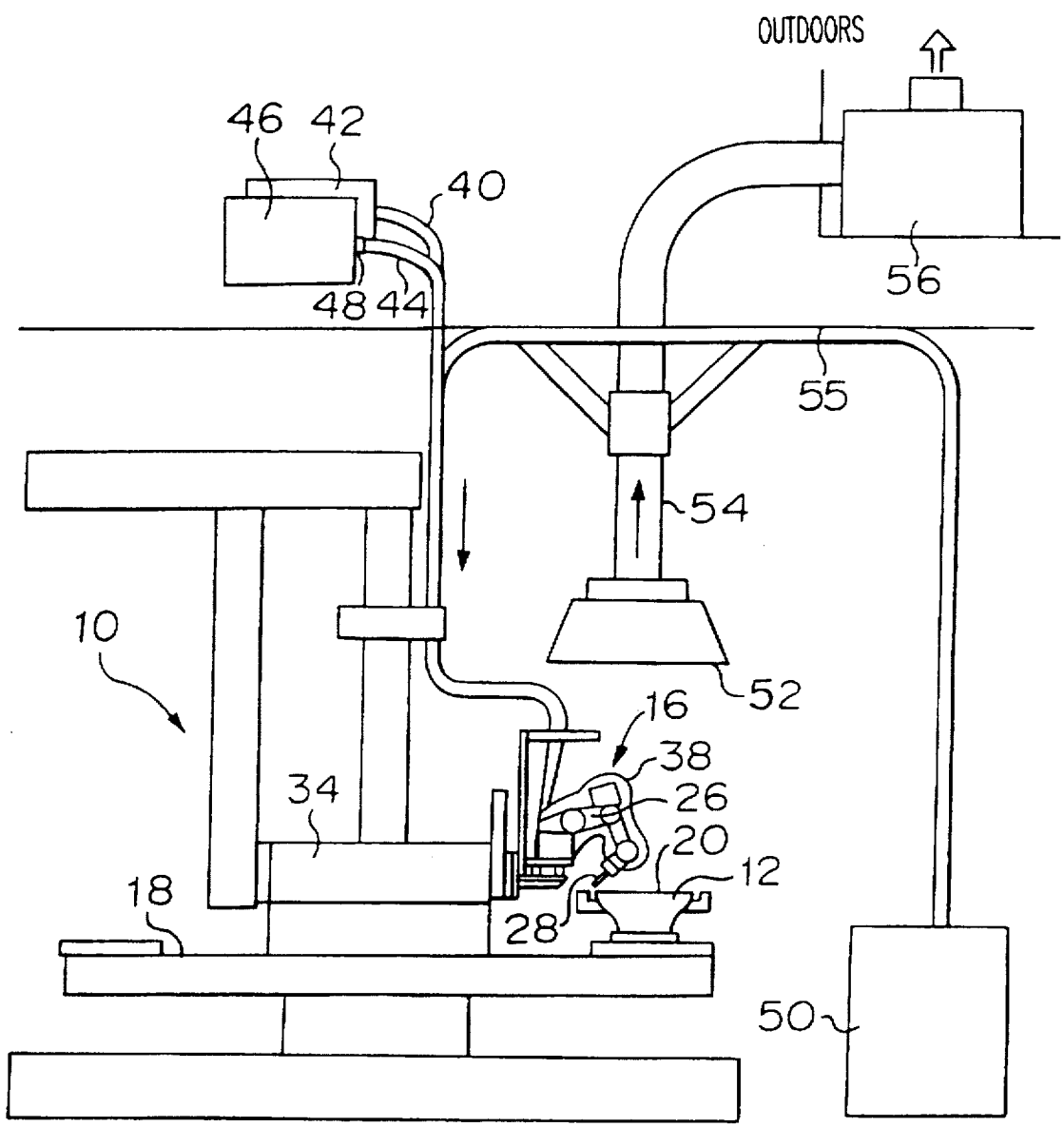
FIG. 1 is a side view of an embodiment of a funnel forming machine with the glass forming machine according to the present invention applied thereto.

In FIG. 1. there is shown a side view showing the essential parts of an example of a funnel forming machine with the glass forming machine according to the present invention applied thereto, more specifically wherein a lubricant spray device is arranged in proximity to a bottom mold. The funnel forming machine 10 shown in FIG. 1 includes bottom molds 12, a plunger 14 (see FIG. 2), a lubricant spray device 16 and other elements.

Figure 2:
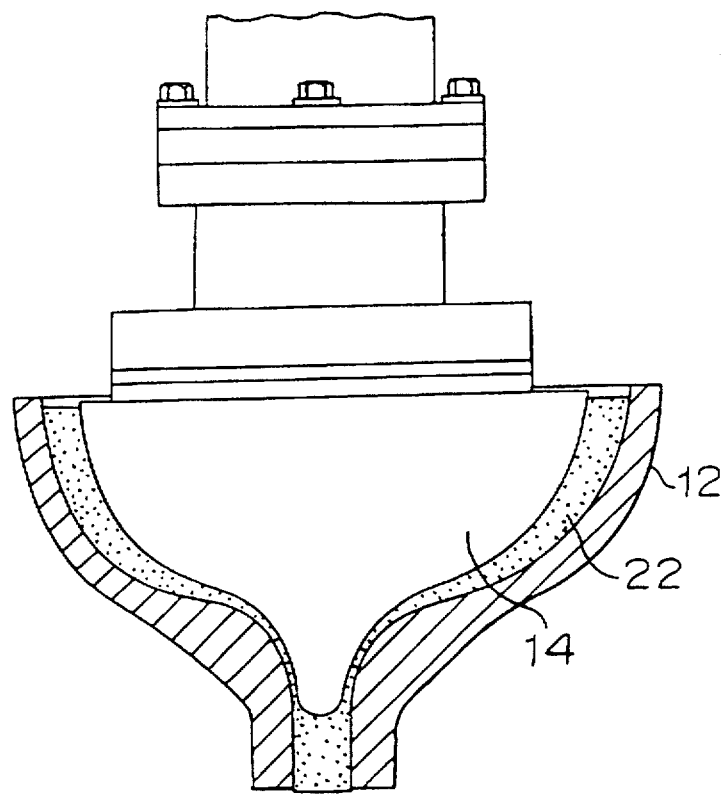
FIG. 2 is a cross-sectional view showing a gob which has been pressed between a bottom mold and a plunger.
Figure 3:
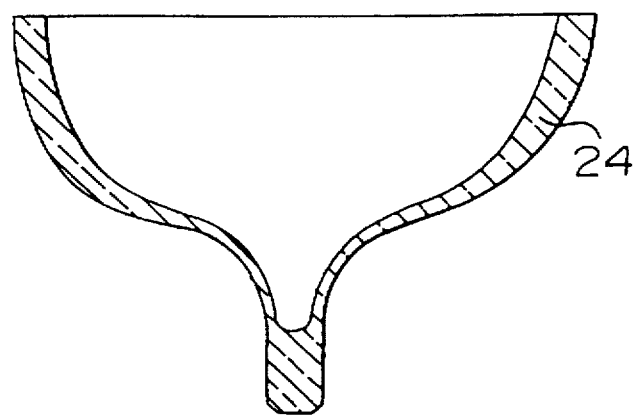
FIG. 3 is a cross-sectional view of a pressed funnel.

The bottom molds 12 are fixed on an index table 18, having an open end 20 directed upwardly. Into the bottom molds, the gob 22 shown in FIG. 2 is loaded. The gob 22 is pressurized by a downward movement of the plunger 14 as shown in FIG. 3 to be pressed into funnel glass 24 for a CRT as shown in FIG. 3. In FIG. 1, the plurality of bottom molds (eleven bottom molds in the example) 12 are arranged on the index table 18 at predetermined intervals. The gobs 22 which have been loaded into the respective bottom molds at a certain position are intermittently moved below the plunger 14 by rotation of the index table 18, and are pressed into the funnel glasses 24 one after another (see FIG. 3).

The lubricant spray device 16 is constituted by a six axes robot 26, a spray head 28 for a lubricant, and other elements as shown in FIG. 1.

Figure 4:
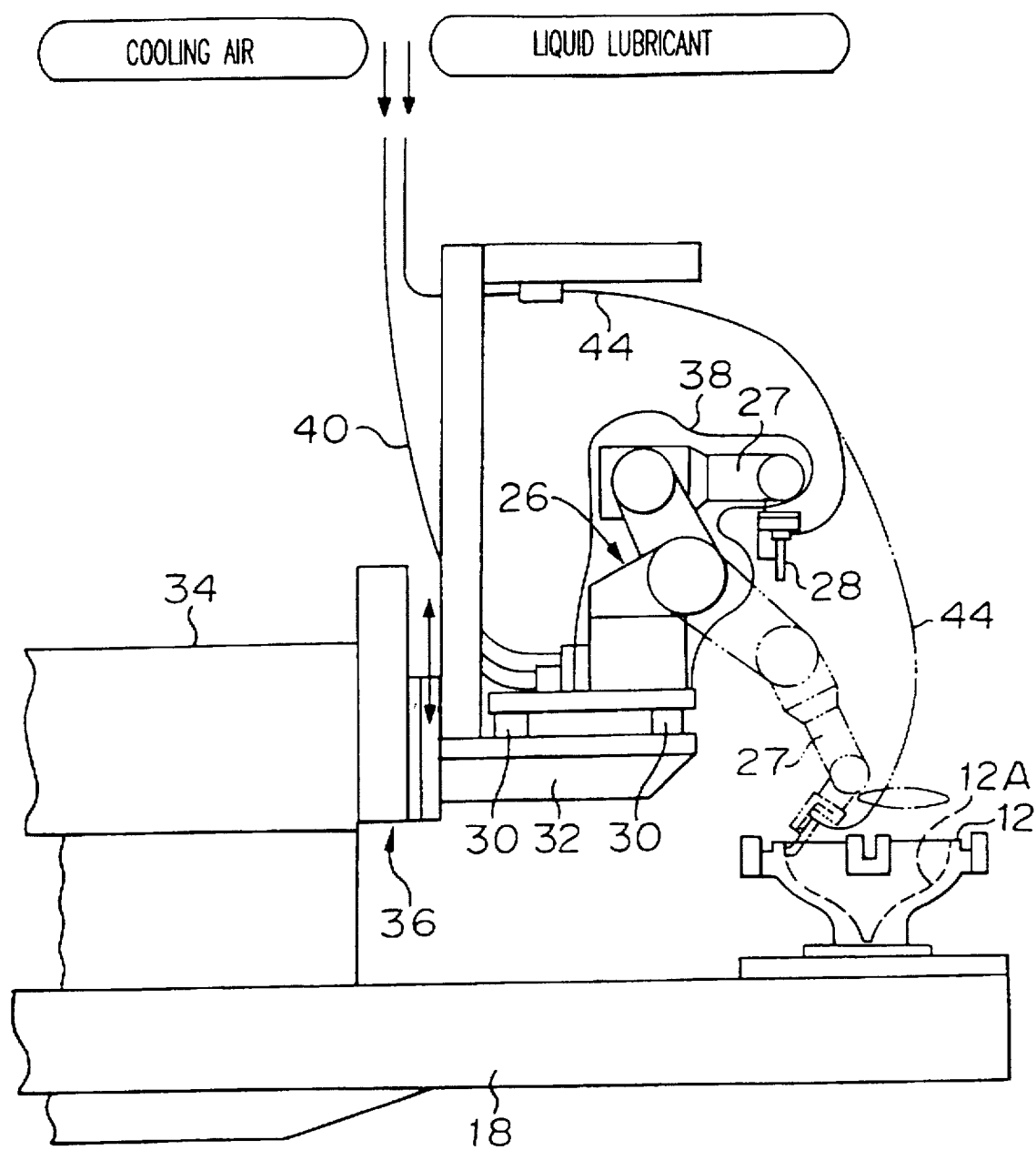
FIG. 4 is an enlarged view of the lubricant spray device shown in FIG. 1.

The robot 26 is arranged on a frame 32 through vibration-proof rubber members 30 and 30 as shown in FIG. 4. The frame 32 is arranged on a fixed table cooling portion 34 through an up-and-down moving apparatus 36. The rubber members 30 are elastic members which can eliminate vibration of the funnel forming machine 10 which is transmitted from the table cooling portion 34 through the up-and-down moving apparatus 36. The up-and-down moving apparatus may be constituted by a guide axis such as a linear motion guide, and a driving device such as a cylinder. When the up-and-down moving apparatus 36 is driven to raise the frame 32, the robot 26 is withdrawn away from the bottom molds 12. When the frame 32 is lowered, the robot 26 is advanced toward the bottom molds 12.

Most portions of the robot 26 are covered by a heat resistant jacket 38. The heat resistant jacket 38 is made of organic composite fiber having excellent resistance to heat. A material which can stand radiant heat (500°–600° C.) in proximity to the bottom molds 12 and ambient temperature (50°–70° C.) is used as such fiber. A cooling air supplying hose 40 has one end connected to the heat resistant jacket 38 and the other end coupled to a cooling fan unit 42 provided at a ceiling portion as shown in FIG. 1. When the cooling fan unit 42 is operated, cooling air is supplied from the cooling fan unit 42 into the heat resistant jacket 38 through the cooling air supplying hose 40.

As shown in FIG. 4, the spray head 28 is fixed to a leading arm of the robot 26, projecting out of the heat resistant jacket 38. A lubricant supplying hose 44 has one end connected to the spray head 28 and the other end connected through a solenoid valve 48 to a lubricant pump unit 46 arranged at a ceiling portion. When the solenoid valve 48 is opened, a liquid lubricant which is supplied from the lubricant pump unit 46 is sprayed from the spray head 28 through the lubricant supplying hose 44.

The robot 26, the cooling fan unit 42 and the solenoid valve 48 are operated and controlled by a control device which is connected to a control panel 50. For example, the robot 26 is operated and controlled so as to move the leading end of the spray head 28 along an inner wall surface 12A of a bottom mold 12 as indicated by chain-dotted lines in FIG. 4. The control device will be explained later.

As shown in FIG. 1, a duct 54 with an air intake 52 is fixedly arranged on a ceiling 55 above the robot 26. The duct 54 is connected to an evacuating fan unit 56 which is arranged at the ceiling portion. When the evacuating fan unit 56 is operated, air near to the robot 26 is sucked by the evacuating fan unit 56 through the air intake 52 and the duct 54, and is evacuated outdoors from the evacuating fan unit 56 through an evacuating duct (not shown).

Now, the structure of the control device will be explained in reference to the block diagram shown in FIG. 5.

Figure 5:
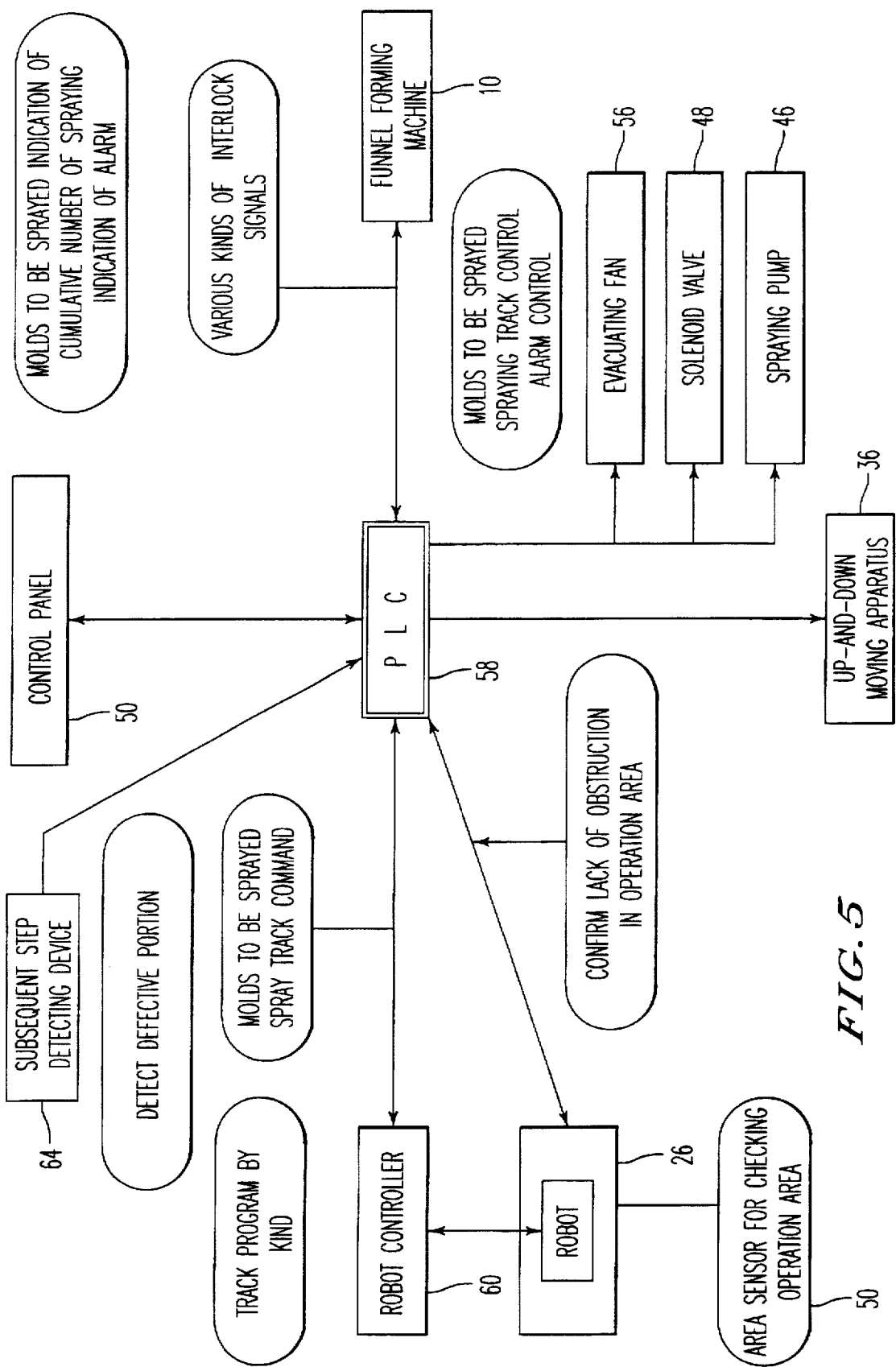
FIG. 5 is a block diagram showing the structure of a control device for the funnel forming machine.

The PLC (Programmed Logic Control) 58 shown in FIG. 5 is a controller which supervises and controls respective devices. A robot controller 60 is a controller which controls a main body of the robot 26.

The PLC 58 manages various kinds of interlock signals from the funnel forming machine 10, execution signals to the robot controller 60, and state signals from the robot controller 60, also manages operation modes based on input signals from the control panel 50, and selects a suitable robot operating program depending on the kind of the bottom molds and the plunger and locations to be sprayed with the lubricant.

Specifically, either a "ganged" or "single" operation is selected at the control panel 50. The "ganged" operation is selected, the PLC 58 operates and controls the funnel forming machine 10 and the robot controller 60 so that the funnel forming machine 10 is interlocked with the robot 26 to spray the lubricant. When selection is made on the kind of molds to be sprayed and the location in the molds to be sprayed at the control panel 50, the PLC 58 selects the kind of the molds and a robot operating track (spraying track) corresponding to the location to be sprayed applicable to the same type molds, which are preprogrammed in the robot controller 60. Then, the PLC 58 controls the robot controller 60 so as to operate the robot 26 in accordance with the selected kind of the molds and the selected robot operating track (spraying track). In addition, the PLC 58 operates and controls the lubricant pump unit 46, the solenoid valve 48 and the evacuating fan unit 56 in accordance with the selected operation mode. When the robot controller 60 outputs a signal indicative of a breakdown of the robot, the PLC 58 operates and controls the up-and-down moving apparatus 36 to withdraw the robot 26 away from the bottom molds 12 and to give an alarm at a display section of the control panel 50. The display section indicates the kind of the molds to be sprayed and a cumulative number of spraying besides the alarm. When an area sensor for checking an operation area which is arranged in the vicinity of the robot 26 detects the presence of a worker, the PLC 58 receives the information on the presence of the worker from the robot controller 60 and manages various interlock signals. When a signal indicative of a defective portion of funnel glass 24 which has been detected by a subsequent step detecting device 64 is input to the PLC 58, the PLC operates the funnel forming machine 10 and the robot controller 60 under feed back control based on the signal. The system may also include an area sensor 62 for checking an operation area.

Figure 6:
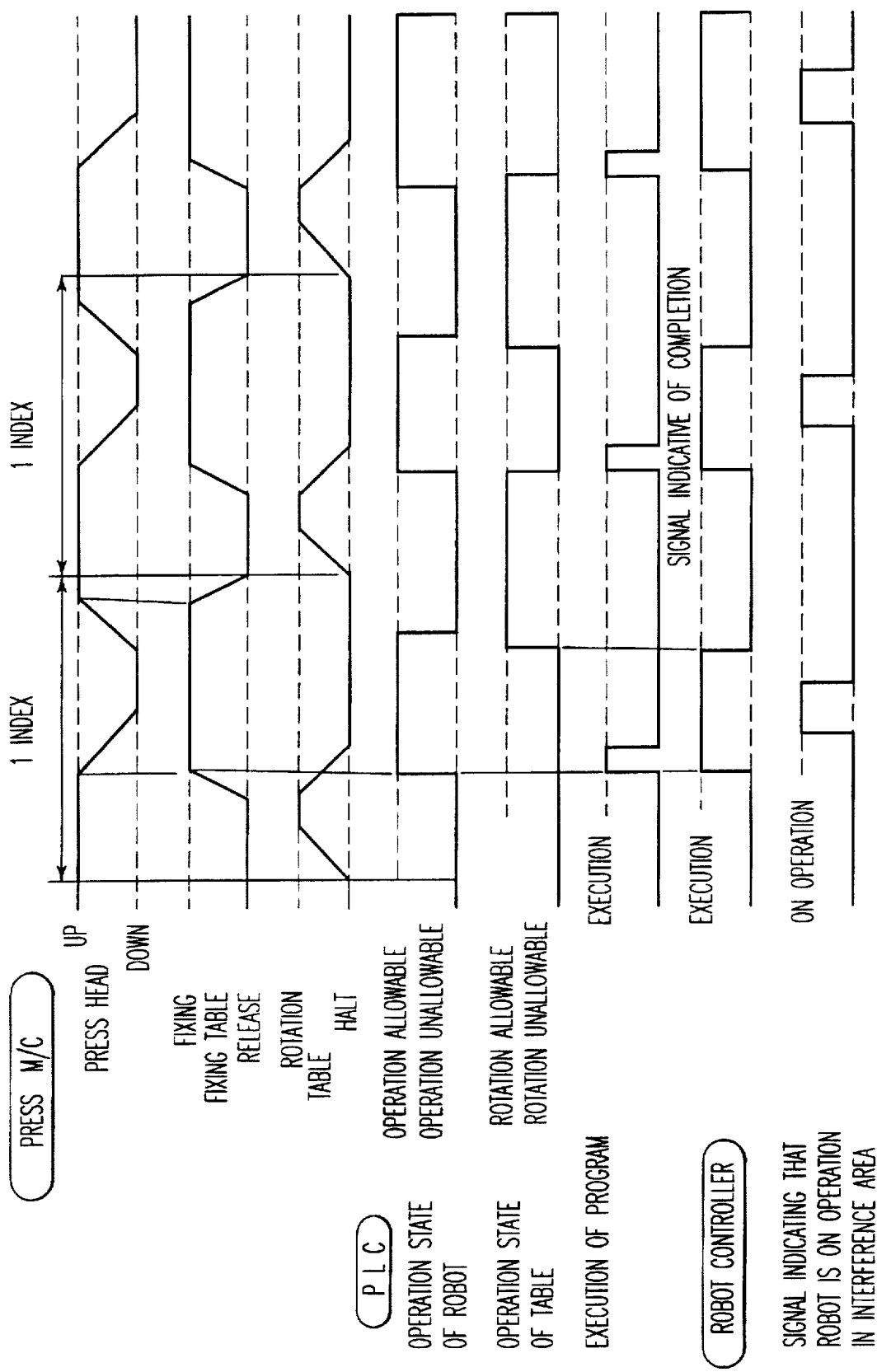
FIG. 6 is a timing chart showing the operation of the funnel forming machine.

Next, the operation of the lubricant spray device 16 thus constructed will be explained, referring to the timing chart shown in FIG. 6.

The indication "1 INDEX" is a period of time which is required to press a piece of funnel glass. The plunger (press head) 14 presses the gob 22 into the funnel glass 24 at a "DOWN" time. At that time, the rotation of the index table 18 halts, and the index table 18 is fixed at that position. The robot 26 operates only when the index table 18 halts. In detail, the PLC 58 outputs a robot action command to the robot controller 60 upon receipt of a signal indicative of completion of fixing the index table 18. The robot 26 is moved along the inner wall surface 12A of a vacant bottom mold 12, the solenoid valve 48 is opened in conjunction with the movement of the robot, and the lubricant is sprayed onto the inner wall surface 12A of the vacant bottom mold by the spray head 28.

When the robot 26 is activated in a robot operation allowable duration between the fixing completion of the index table 18 and the release of the downward position of the plunger (press head) 14, the robot controller 60 outputs to the PLC 58 state signals indicating that the robot is active, that the robot is acting in the interference area (the spraying action is being made) and that the robot has competed its action. When the signal indicative of completion of the robot action is absent in the robot operation allowable duration, the PLC 58 interrupts the robot action command, and outputs an emergency withdrawal command (command indicative of a return movement to the original withdrawal position and a shutoff of a power source for an electric motor) to the robot controller 60. Unless the PLC 58 receives a signal indicative of completion of the emergency withdrawal from the robot controller 60 after execution of the emergency withdrawal command, the PLC outputs a rotation stopping a command (command indicating that the rotation is not allowable) to a controller for the funnel forming machine 10. Thus, the press machine stops for emergency withdrawal.

In accordance with the embodiment, the robot 26 which is provided with the spray head 28 for spraying the lubricant is arranged above the bottom molds 12, and the robot 26 and the spray head 28 (as well as the lubricant pump unit 46 and the solenoid valve 48) are operated and controlled to spray the lubricant on the inner surface of the bottom molds 12, allowing the lubricant applying operation to be automated.

In the embodiment, the robot 26 is arranged through the vibration-proof rubber members 30 on the frame 32 which is attached to the table cooling portion (fixed part) 34 of the funnel forming machine. The provision of the robot 26 on the frame can eliminate the need for an additional space for the robot 26 at a peripheral portion of the funnel forming machine 10 to establish space saving, and remove the vibration from the funnel forming machine 10, in particular the vibration generated on pressing, by the vibration-proof rubber members 30 to prevent the robot 26 from breaking down due to the vibration.

In the embodiment, the robot 26 is provided on the funnel forming machine 10 through the up-and-down moving apparatus 36, allowing the robot 26 to be withdrawn away from the bottom molds 12 when the robot 26 breaks down during spraying the lubricant. Such an arrangement allows loading of the gob 22 and pressing by the plunger 14 to be carried out without interrupting the operation of the funnel forming machine 10. When any repairing of the robot 26 has been completed, the robot 26 can be brought near a bottom mold 12 by the up-and-down moving apparatus 36 to be returned to the active position.

In the embodiment, the robot 26 can be covered by the heat resistant jacket 38 to protect the robot from a high temperature atmosphere, improving the durability of the robot 26. In the embodiment, the cooling air is supplied into the heat resistant jacket 38 to forcibly cool the robot 26, further improving the durability of the robot 26. In addition, in the embodiment, the evacuating duct 54 is provided in proximity to the robot 26, and the evacuating fan unit 56 sucks and evacuates smoke which is generated when the lubricant is sprayed, allowing the atmosphere of the funnel forming machine to be kept in a clean state.

Although not shown as other embodiments, the present invention is also applicable to a glass forming machine with a pair of bottom molds and plunger, and a glass forming machine wherein a plurality of bottom molds are sequentially and linearly moved with respect to a single plunger.

In accordance with the present invention, the lubricant spraying robot may be provided in proximity to the plunger. In that case, the lubricant spraying robot with the nozzle is arranged in the vicinity of the plunger, and the lubricant is automatically sprayed onto an outer surface of the plunger while the plunger is held in stand-by at an upper position in preparation for a next pressing.

In order to uniformly and quickly spray the lubricant on a mold surface having a complicated three dimensional curved surface, it is preferable that the lubricant spraying device according to the present invention is normally a robot type device to quickly adjust the direction and the height of the spray nozzle with high precision.

As explained, in accordance with the glass forming machine according to the present invention, the spraying device which is provided with the nozzle for spraying the lubricant is arranged in proximity to a bottom mold and/or the plunger, and the spray device is operated and controlled to spray the lubricant onto the mold surfaces of the bottom mold and the plunger, allowing the lubricant applying operation to be automated and the lubricant to be uniformly applied. As a result, worker's safety is ensured, and it is possible to form funnel glass and panel glass which are free from poor spray and dimensional unstability and which have high quality.

What is claimed is:

1. A glass forming machine comprising:

a bottom mold into which a molten glass gob is loaded;

a plunger which presses the gob in the bottom mold; and a spray device provided with a nozzle for spraying a lubricant, the spray device being arranged in proximity to at least one of the bottom mold and the plunger, and wherein the nozzle is operated and controlled to spray the lubricant on a mold surface of one of the bottom mold and the plunger;

wherein the nozzle is operated and controlled by a robot;

wherein the robot is covered by a heat resistant jacket; and wherein a cooling air supply is provided to supply cooling air into the heat resistant jacket.

2. A glass forming machine according to claim 1, further comprising:

a vibration-proof means and a frame supporting the spray device at a fixed part of the glass forming machine.

3. A glass forming machine according to claim 2, wherein the frame is arranged at the fixed part through moving means so that the frame can be advanced by the moving means to bring the spray device close to one of the bottom mold and the plunger, and the frame can be withdrawn by the moving means to take the spray device away from one of the bottom mold and the plunger.

4. A glass forming machine according to claim 1, wherein evacuating means is provided in proximity to the spray device to suck and evacuate smoke which generates when the lubricant is sprayed.

* * * * *